(12) United States Patent
Miller

(10) Patent No.: US 7,470,028 B2
(45) Date of Patent: Dec. 30, 2008

(54) IMAGE PROJECTION DEVICE AND METHOD

(76) Inventor: Richard J Miller, QinetiQ Limited, Malvern Technology Centre, St Andrew's Road, Malvern, Worcestershire (GB) WR14 3PS ( * ) Notice: Subject to any disclaimer, the term of this patent is extended or adjusted under 35 U.S.C. 154(b) by 192 days.

(21) Appl. No.: 10/542,491

(22) PCT Filed: Jan. 19, 2004

(86) PCT No.: PCT/GB2004/000224

§ 371 (c)(1), (2), (4) Date: Jul. 15, 2005

(87) PCT Pub. No.: WO2004/066037

PCT Pub. Date: Aug. 5, 2004

(65) Prior Publication Data

US 2006/0181682 A1      Aug. 17, 2006

(30) Foreign Application Priority Data

Jan. 21, 2003    (GB) ................................ 0301317.4

(51) Int. Cl.
    *G03B 21/14* (2006.01)
(52) U.S. Cl. .......................................... 353/31; 359/10
(58) Field of Classification Search ................ 353/31, 353/34, 37, 122; 359/9, 10, 11
    See application file for complete search history.

(56) References Cited

U.S. PATENT DOCUMENTS

| | | | | |
|---|---|---|---|---|
| 5,012,274 A | * | 4/1991 | Dolgoff | 345/88 |
| 5,798,864 A | * | 8/1998 | Sekiguchi | 359/559 |
| 5,805,244 A | * | 9/1998 | Suh | 349/7 |
| 5,897,190 A | * | 4/1999 | Takahashi | 353/31 |
| 6,637,888 B1 | * | 10/2003 | Haven | 353/31 |
| 6,654,156 B1 | * | 11/2003 | Crossland et al. | 359/290 |
| 6,927,748 B2 | * | 8/2005 | Hughes et al. | 345/32 |
| 7,094,502 B2 | * | 8/2006 | Schaefer et al. | 430/1 |
| 2002/0149584 A1 | | 10/2002 | Simpson | |
| 2004/0184287 A1 | * | 9/2004 | Smith et al. | 362/560 |

(Continued)

FOREIGN PATENT DOCUMENTS

EP    1 040 927    10/2000

(Continued)

OTHER PUBLICATIONS

United Kingdom Search Report for GB 0301317.4 dated Jun. 13, 2003.

(Continued)

*Primary Examiner*—William C. Dowling
(74) *Attorney, Agent, or Firm*—Stolowitz Ford Cowger LLP

(57) ABSTRACT

A device for forming an image on a screen is described that comprises a coherent illumination means, an electrically addressed spatial light modulator means located in the path of light from the coherent illumination means, means for producing computer generated hologram images for display on the electrically addressed spatial light modulator means, and optics to direct light diffracted by the electrically addressed spatial light modulator means to the screen. The device is arranged so that a computer generated image or images displayed by the electrically addressed spatial light modulator means result in a two dimensional image being formed at the screen.

22 Claims, 2 Drawing Sheets

U.S. PATENT DOCUMENTS

| | | | |
|---|---|---|---|
| 2004/0196524 A1* | 10/2004 | Hughes et al. | 359/244 |
| 2004/0246547 A1* | 12/2004 | Payne | 359/3 |
| 2004/0263930 A1* | 12/2004 | Payne | 359/32 |
| 2005/0094230 A1* | 5/2005 | Klug et al. | 359/3 |
| 2006/0050374 A1* | 3/2006 | Slinger | 359/385 |
| 2006/0250671 A1* | 11/2006 | Schwerdtner et al. | 359/9 |

FOREIGN PATENT DOCUMENTS

| | | |
|---|---|---|
| WO | 00/40018 | 7/2000 |

OTHER PUBLICATIONS

International Search Report for PCT/GB2004/000224 dated May 26, 2004.

Hirokoshi et al., Time-sharing display approach using Liquid Crystal Light Valve and a Photorefractive Crystal for electroholography, *Practical Holography XIII*, Jan. 25, 1999, vol. 3637, pp. 64-71, XP002278856.

Cameron, et al., Computational challenges of emerging novel true 3D holographic displays, *Critical Technologies for the Future of Computing*, Jul. 31-Aug. 4, 2000, vol. 4109, pp. 129-140, XP002278857.

* cited by examiner

PRIOR ART

IMAGE PROJECTION DEVICE AND METHOD

This invention relates to an image projection device, and in particular to an image projection device for forming a two dimensional image on a screen.

Image projection devices, such as those use in lecture theatres etc, are well known. Typically, an image is written to an electrically addressed spatial light modulator (EASLM) and an optical arrangement projects a magnified image of the EASLM to a screen. Colour images can be readily formed using three EASLM channels to project red, green and blue images to the screen.

Although conventional projection techniques are adequate to display television pictures and the like, the total number of pixels that can be displayed is limited to the number of EASLM pixels. Previously, images having a higher pixel count have been produced by using a number of separate projectors to build up sub-regions of an overall image. For example, the Department of Energy of the United State of America has developed a "high precision power wall" that uses a four-by-four array of projectors to produce a twenty-million colour pixel display that operates at video rate.

The disadvantages of producing images by blending the outputs of a number of separate projector devices are numerous. For example, multi-projector systems typically produce noticeable artefacts at the boundaries of each projector's imaging area. Although attempts have been made to develop various software and hardware tools to minimise these unwanted artefacts, they have not proved particularly effective. Adjustment of the relative alignment of the projectors can also prove time consuming, and distortion introduced by the lenses will limit the degree of correction that is ultimately achievable. Furthermore, the colour balance of projectors will vary with time and ensuring colour uniformity across the image thus requires frequent re-calibration of the colour output of the projectors.

WO00/40018 demonstrates how a high complexity image may be sequentially written to an optically addressed spatial light modulator (OASLM) using a so-called active tiling system. The high complexity two dimensional image stored by the OASLM can then be projected to a screen. Alternatively, a computer generated hologram may be written to the OASLM and used to provide a three dimensional (also termed volumetric) image. A number of computational methods used to calculate CGHs are described in Cameron et. al., "Computational challenges of emerging novel true 3D holographic displays", paper 4109-23, presented at the SPIE conference on "Critical technologies for the future of computing", August, San Diego, USA. Published in proc. SPIE vol. 4109.

Systems of the type described in WO00/40018 are particularly advantageous when massive pixel counts are required from a spatial light modulator in order to form volumetric images. However, the multiple active tiling projection channels coupled with the need for an OASLM make such devices complex and costly making them unsuitable for use as two-dimensional image projectors.

According to a first aspect of the present invention a device for forming an image on a screen comprises a coherent illumination means, an electrically addressed spatial light modulator means located in the path of light from the coherent illumination means, means for producing computer generated hologram images for display on the electrically addressed spatial light modulator means, and optics to direct light diffracted by the electrically addressed spatial light modulator means to the screen, wherein the computer generated image or images displayed by the electrically addressed spatial light modulator means result in a two dimensional image being formed at the screen.

A device of the present invention thus writes a CGH pattern to the electrically addressed spatial light modulator means, and diffraction therefrom forms an image on the projection screen. The present invention thus uses diffraction from the electrically addressed spatial light modulator means to build up the required image at the screen. It should be noted that this effect is quite distinct to prior art two dimensional projection systems where a copy of the image formed on an EASLM is projected (usually with some degree of magnification) to the screen.

A person skilled in the art would recognise that the term computer generated hologram (CGH) image means an image that produces a required diffraction pattern when illuminated with coherent radiation. In effect a CGH image is a highly complex diffraction grating that is calculated using standard techniques in order to provide the required interference pattern at the screen.

An advantage of devices of the present invention is the ability to tile multiple images without the unwanted blending effects and artefacts that are associated with typical prior art multiple projector devices. This benefit arises from producing and displaying computer generated hologram (CGH) images that can diffract light to any point on the two dimensional screen. Any non-uniformities or misalignment of the optical components making up the device can thus be compensated for by appropriate design of the CGH image.

In particular, it has been found that the present invention does not require precise alignment of the electrically addressed spatial light modulator means with respect to the projection optics. The optical quality of the components making up the system may also be lower than those required in standard projection systems. In prior art devices, incoherent white light sources were typically employed as illumination means and coherent sources were avoided as they introduced unwanted interference effects. In contrast, the present invention uses diffraction to actually build up the required image at the screen.

The present invention also has advantages over the active tiling systems described in WO00/40018. In particular, there is no requirement to provide an OASLM which reduces the overall cost of the device.

Conveniently, the electrically addressed spatial light modulator means comprises a plurality of electrically addressed spatial light modulators.

Forming the electrically addressed spatial light modulator means using a plurality of EASLMs enables a high pixel count to be attained. Unlike prior art systems, the present invention does not require each EASLM to be in precise alignment with the illumination and projection optics and with any adjacent EASLMs. The CGH image written to each EASLM can simply be adjusted so as to form the desired image or part of an image at the screen. For example, it would be possible to perform a calibration process prior to use of the system so that edge alignment effects are eliminated. The required pixel count may be provided by a small number of high complexity (e.g. 8 Megapixel) displays or by a larger number of lower complexity displays.

Advantageously, the coherent illumination means illuminates the electrically addressed spatial light modulator means with red, green and blue light. The use of red, green and blue illumination allows a colour image to be formed at the screen. The use of more than these three colours of light would advantageously allow further extension of the colour gamut.

Conveniently, the electrically addressed spatial light modulator means is sequentially illuminated by the coherent illumination means with red, green and blue light. In other words, a field sequential colour technique could be employed to build up the two dimensional colour image formed at the screen.

Alternatively, separate portions of the electrically addressed spatial light modulator means are simultaneously illuminated by the coherent illumination means with red, green and blue light. In other words, different portions of the electrically addressed spatial light modulator means could be continuously illuminated with the different colours of light. For example, if the electrically addressed spatial light modulator means comprised three EASLMs it would be possible to illuminate each EASLM with light of a different colour. In this manner, a resultant two dimensional colour image could be formed.

Preferably, the frame rate of the electrically addressed spatial light modulator means is greater than the frame rate of the two dimensional image formed at the screen. The high update speeds of an electrically addressed spatial light modulator means can be used to build up a higher complexity image at the two dimensional screen.

As described above, the CGH may be calculated in many ways. Conveniently, the means for producing computer generated hologram images comprises a store of a plurality of pre-calculated computer generated holographic elements or so-called "hogels". Each of these "hogels" is a diffraction pattern that generates a single pixel on the projection screen. These hogels can then be combined to create the required projected pattern. This greatly enhances the computation speed.

Advantageously, the means for producing computer generated hologram images is configured to produce computer generated hologram images for display on the electrically addressed spatial light modulator means that provide a regular array of pixels on the screen.

Although the electrically addressed spatial light modulator means may be written with a CGH image that provides diffraction to any point on the screen, it is preferred to form the two dimensional image from an array of pixels. For example, the two dimensional image may be constructed as a rectangular array of pixels. It would also be possible to provide certain areas of the screen having a higher pixel density than other. The use of such pixel arrays is especially advantageous when used in combination with pre-calculated CGH images.

Preferably, the array of pixels on the screen is sub-divided into blocks and the image at the screen is formed by sequentially writing one or more blocks to the screen. In this manner, the two dimensional image may be readily formed.

Conveniently, the coherent illumination means comprises at least one laser. The use of a laser ensures colour uniformity across the display and a wide colour gamut.

This provides significant advantages over prior art systems that employ white light sources.

Advantageously, additional magnification optics are provided such that a magnified two dimensional image may be formed at the screen.

According to a second aspect of the present invention, a method of forming a two dimensional image on a screen comprising the steps of; (i) illuminating an electrically addressed spatial light modulator means with coherent light, (ii) displaying a computer generated hologram image on the electrically addressed spatial light modulator means so as to diffract light therefrom, and (iii) using optics to direct light diffracted by the electrically addressed spatial light modulator means to a screen, whereby the electrically addressed spatial light modulator means is arranged to display an image or images that produce a two dimensional image at the screen.

The invention will now be described, by way of example only, with reference to the following drawings in which.

Referring to FIG. 1, a prior art multiple channel projection device 2 is shown.

Figure 1A:
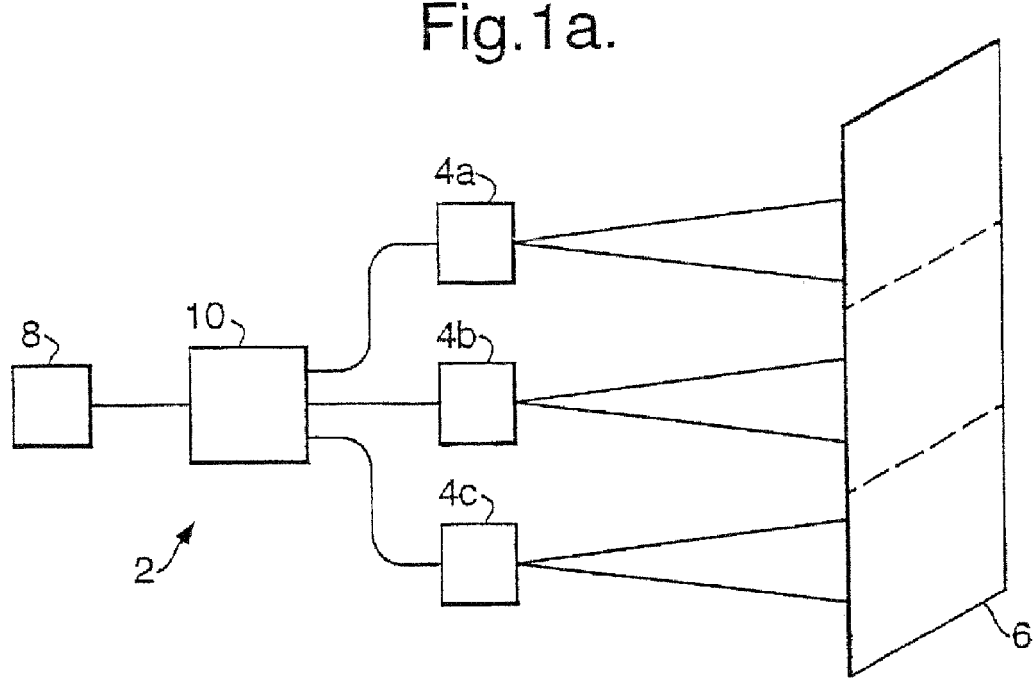
FIG. 1 shows a typical prior art multiple channel projector system.

The device 2 shown in FIG. 1a comprises a one dimensional array of colour projectors 4a-4c (collectively referred to as 4) that are co-located so as to each form a portion of an image displayed on the projection screen 6. The image to be displayed is produced by an appropriate image creation means 8, which may comprise a video source, computer etc. A control means 10 is provided to divide the image into the separate portions that are to be displayed by each of the colour projectors 4.

Figure 1B:
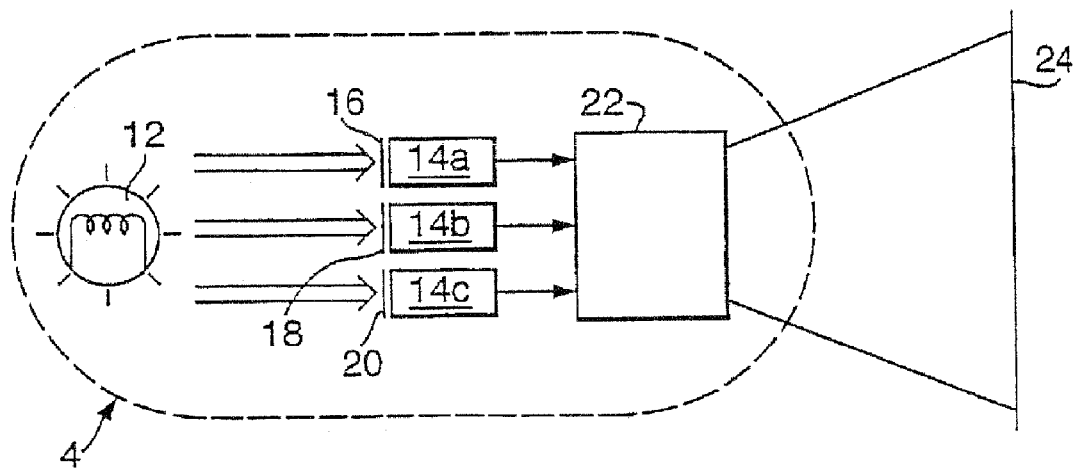

As shown in FIG. 1b, each colour projector 4 comprises a white light source 12, three EASLMS 14a-14c, a red colour filter 16, a green colour filter 18 and a blue colour filter 20. The image displayed by each of the EASLMs is magnified and projected by the projection optics 22 to an image plane 24 where a colour image is formed.

The example described with reference to FIG. 1 illustrates a one dimensional array of colour projectors for simplicity. In reality, it is usual for a two dimensional array of colour projectors to be used. As described in more detail above, such multiple projector systems can prove difficult to align, tend to suffer from the presence of unwanted artefacts and exhibit non-uniformity of colour balance and intensity.

Figure 2:
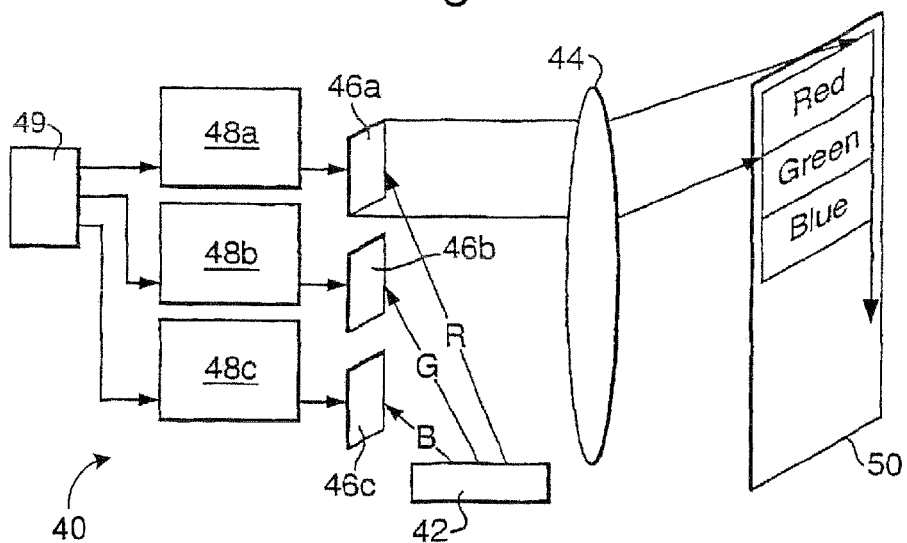
FIG. 2 shows an image projection device according to the present invention.

Referring to FIG. 2, an image projection system 40 according to the present invention is shown. The image projection system comprises a source of coherent light 42, Fourier projection optics 44 and three EASLMs 46a-46c (collectively referred to as 46) each having an associated control means 48. An image source means 49 is also provided to produce the three separate colour images for display. The coherent light source 42 is arranged to direct red light to the EASLM 46a, green light to the EASLM 46b and blue light to the EASLM 46c.

An array of colour "pixels" can be generated at the projection screen 50 by writing suitable computer generated hologram (CGH) images to the appropriate EASLM. In other words, diffraction from each pixel of each EASLM is used to produce the required arrangement of pixel(s) at the projection screen 50. For a given colour (i.e. for light of a given wavelength), each pixel on the projection screen is generated by a displaying a unique CGH pattern formed on the associated EASLM.

It should be emphasised that writing a CGH pattern to the EASLM, and using diffraction therefrom to form an image on the projection screen, is quite distinct to prior art two dimensional projection systems where a copy of the image formed on the EASLM is projected (usually with some degree of magnification) to the screen. The CGH image displayed by the EASLM in the present invention is very different to the two dimensional image that is formed at the screen. In fact, the skilled person would not be able to predict the particular image that will be produced at the screen by visual inspection of an image that has been written to the EASLM.

The control means 48 calculates the CGH pattern that is written to the EASLM. The CGH pattern for specific projected pixels is commonly termed a 'hogel' and can be pre-computed and stored in a look up table. The hogel patterns that produce individual pixels at the projection screen can be combined to build up a resultant CGH pattern. The resultant CGH pattern provides a plurality of pixels at the at the screen in the desired pattern. More detail on the computation of appropriate CGH patterns can be found elsewhere, for example see Cameron et. al., "Computational challenges of emerging novel true 3D holographic displays", paper 4109-23, presented at the SPIE conference on "Critical technologies for the future of computing", August, San Diego, USA. Published in proc. SPIE vol. 4109.

In the system shown in FIG. 2, the image at the projection screen is built up in blocks. It should be noted that a block may contain any number of pixels; for example the block may comprise a line or several lines of pixels. Alternatively, each block may comprise pixels spaced across the projection screen. For low resolution images, it would also be possible for an image to be constructed from a single block. The number of pixels contained in each block also determines the number of hogels that need to be combined in order to produce the CGH image for display on the EASLM. The use of smaller block sizes thus decrease the computation effort required to calculate the required CGH pattern, but as block size decreases a greater number of blocks are obviously required to construct an image of a given complexity.

To construct the required image, each of the colour blocks is displayed for a fraction of the frame time. The pattern on the EASLM is then changed to illuminate another part of the projection screen. In this way, all of the screen is illuminated with all of the colours over one frame time. It is possible for one block of the screen to be illuminated by all three colour channels simultaneously. The pattern on each of the three EASLMs could then be re-written such that the illuminated block moves down the projection screen in steps until the whole frame image is built up. Alternatively, and as shown in FIG. 2, different blocks of the screen can be simultaneously illuminated with each colour.

It is clear that each EASLM and associated control means must be capable of generating the required diffraction patterns in rapid succession. The type of update speed required can be estimated by considering the case of a system comprising a single EASLM. To obtain a colour image from such a system requires the use of field sequential colour techniques.

Let us say that the final desired display resolution is N pixels broken up into b blocks. Then each block has N/b pixels and N/b hogels must be combined to create the CGH pattern. Each block is illuminated in sequence to build up a frame, hence each frame must be fast in order to give the viewer a perception that the whole display is being illuminated. If the number of frames produced each second is f then the number of EASLM frames per second is given by f*b. This means that the total number of hogels that must be combined in each second is f*N. This result is independent of the block size and suggests that the only way to bypass the computational burden is to run computations in parallel. A typical field sequential colour frame rate is around two hundred frames per second, and thus for a ten million pixel image produced using a single EASLM around $2 \times 10^9$ hogels must be combined per second.

In a system with red, green and blue EASLM channels, each channel may act independently thereby cutting the frame rate per channel by a third and also reducing the computational burden per channel by one third. It is also possible consider a number of channels per colour, each dedicated to its own area of the projection screen. This allows alignment of the sections to occur in software rather than hardware and also enables the hogel combination to occur in parallel thereby reducing further the computational burden per channel. If we consider three channels per colour, giving a total of nine EASLMs, then in the above example the number of hogel combination operations per channel would be about $2 \times 10^8$.

A system of the present invention also permits EASLMs that provide greyscale to be exploited to give a high diffraction efficiency, reduced computational load and lower power laser. An example of a fast greyscale liquid crystal EASLM is an electro-clinic device. Assuming that the EASLM device runs at a frame rate of $10^5$ Hertz and that the overall device frame rate is 66 Hz, then the number of blocks per image can be as high as fifteen-hundred. This is around two to three lines of a ten million pixel image.

Figure 3:
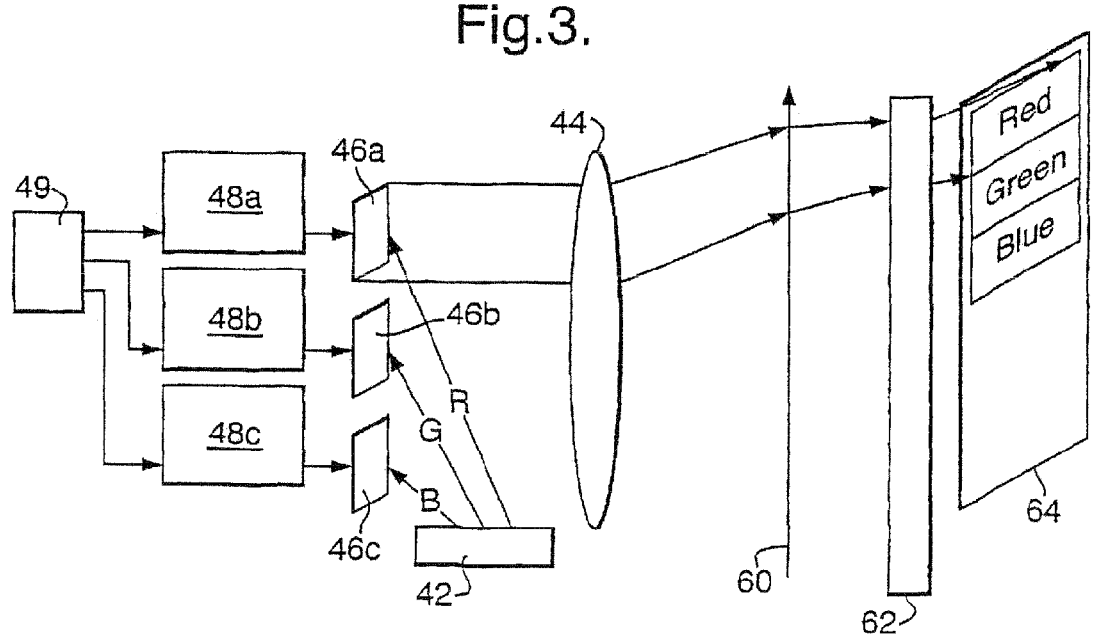
FIG. 3 shows a schematic illustration of an image projection device of the present invention configured to provide a magnified image.

Referring to FIG. 3, an alternative arrangement of the present invention is shown which provides a magnified two dimensional image. In effect, the two dimensional screen of the device of FIG. 2 is replaced with a conjugate block 60. Projection optics 62 are also provided to magnify the image formed at the conjugate block to a larger two dimensional screen 64. In this manner, the magnification of the image can be readily controlled.

Alternatively, the whole projected image could be projected simultaneously using a plurality of EASLMs. These could be conventional projection EASLMs running at a 60 Hz frame rate and split into three or more groups to give full colour. This has the advantage of allowing the use of commercial off the shelf components.

The invention claimed is:

1. A device for forming a two dimensional image on a screen comprising:
   a coherent illumination means;
   an electrically addressed spatial light modulator means configured to diffract light received from the coherent illumination means, wherein the light is received by said electrically addressed spatial light modulator means as a plurality of sequential computer generated images; and
   optics configured to direct light diffracted by the electrically addressed spatial light modulator means to different areas of the screen to optically build up a single frame of the two dimensional image over time, wherein each of the plurality of sequential computer generated images correspond to one of the different areas of the screen.

2. The device according to claim 1 wherein the electrically addressed spatial light modulator means comprises a plurality of electrically addressed spatial light modulators, each modulator configured to receive a different color sequence of computer generated images, wherein said single frame is built up using a plurality of computer generated images from each of the different color sequences.

3. The device according to claim 1 wherein the coherent illumination means illuminates the electrically addressed spatial light modulator means with red, green and blue light.

4. The device according to claim 3 wherein the electrically addressed spatial light modulator means is sequentially illuminated by the coherent illumination means with red, green and blue light.

5. The device according to claim 3 wherein separate portions of the electrically addressed spatial light modulator means are simultaneously illuminated by the coherent illumination means with red, green and blue light.

6. The device according to claim 1 wherein a frame rate of the electrically addressed spatial light modulator means is greater than a frame rate of the two dimensional image formed at the screen.

7. The device according to claim 2, wherein each different color is divided into a number of channels, each channel dedicated to one of the different areas of said screen.

8. The device according to claim 1 in which said light is sequentially directed to the different areas of said screen, each of said different areas associated with a number of lines of pixels that when combined appear to form said two dimensional image comprised of an array of said pixels.

9. The device according to claim 8 wherein a rate of sequentially directing said light to said different areas is faster than a frame rate of displaying said two dimensional image at the screen.

10. The device according to claim 1 wherein the coherent illumination means comprises at least one laser.

11. The device according to claim 1 further comprising magnification optics configured to magnify said two dimensional image formed at the screen.

12. A method of forming a two dimensional image on a screen comprising:
   illuminating an electrically addressed spatial light modulator with coherent light;
   displaying a computer generated hologram image on the electrically addressed spatial light modulator so as to diffract light therefrom;
   sub-dividing the two dimensional image into a number of adjacent blocks, wherein each of said adjacent blocks is associated with a different region of said screen; and
   directing light diffracted by the electrically addressed spatial light modulator to sequentially write the blocks to the screen.

13. The method according to claim 12 wherein a rate of writing the blocks is greater than a frame rate of the two dimensional image produced at the screen.

14. The method according to claim 12 wherein the electrically addressed spatial light modulator (EASLM) is comprised of a plurality of EASLM, wherein each of said adjacent blocks is comprised of light diffracted by one or more of said plurality of EASLM.

15. The method according to claim 14 wherein each of said EASLM is illuminated by a different color light, the two dimensional image formed by combining said adjacent blocks comprised of one or more of said different color light.

16. A device for forming a two dimensional image on a screen comprising;
   a plurality of electrically addressed spatial light modulators configured to simultaneously diffract light received from one or more coherent light sources; and
   optics configured to direct light diffracted by said plurality of electrically addressed spatial light modulators to the screen, wherein a frame rate of each of the electrically addressed spatial light modulators is greater than a frame rate of the two dimensional image formed at the screen.

17. The device according to claim 16 wherein said diffracted light is configured to cumulatively build up said two dimensional image comprised of a regular array of pixels on said screen.

18. The device according to claim 17 wherein said array of pixels is sub-divided into a plurality of adjacent blocks.

19. The device according to claim 18 wherein the two dimensional image is formed by sequentially writing said plurality of blocks to the screen.

20. The device according to claim 16 wherein said one or more coherent light sources comprise a plurality of coherent lasers.

21. The device according to claim 20 wherein said plurality of coherent lasers comprises at least a red, blue and green laser.

22. The device according to claim 16 further comprising magnification optics.

* * * * *

UNITED STATES PATENT AND TRADEMARK OFFICE
CERTIFICATE OF CORRECTION

PATENT NO. : 7,470,028 B2
APPLICATION NO. : 10/542491
DATED : December 30, 2008
INVENTOR(S) : Richard Jonathan Miller Page 1 of 1

It is certified that error appears in the above-identified patent and that said Letters Patent is hereby corrected as shown below:

At column 8, line 9, delete "comprising;" and insert -- comprising: --, therefor.

Signed and Sealed this

Fifteenth Day of September, 2009

David J. Kappos
*Director of the United States Patent and Trademark Office*